Feb. 7, 1939. A. Y. DODGE 2,146,369
TRANSMISSION
Filed Aug. 2, 1935 2 Sheets-Sheet 2

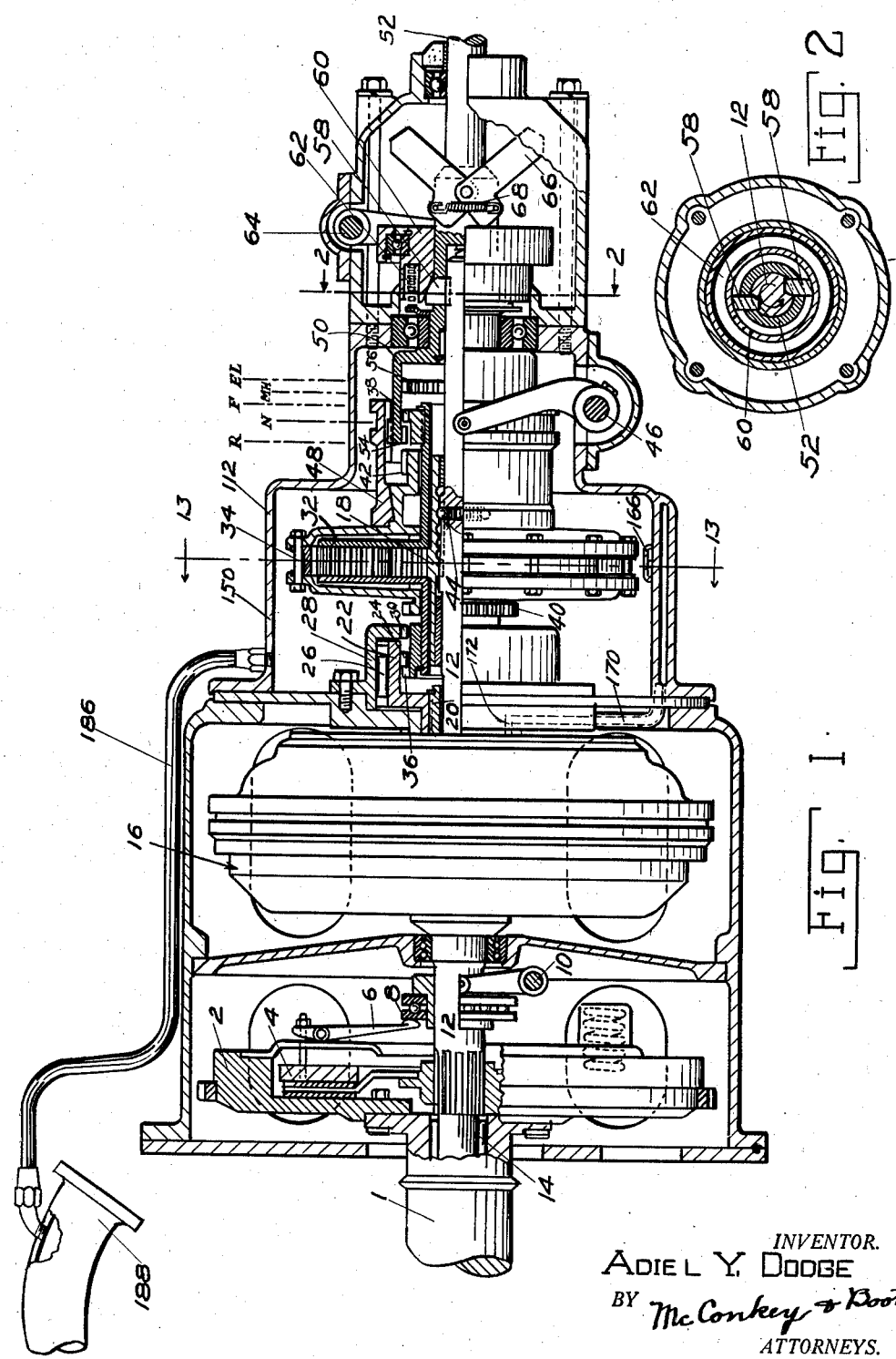

INVENTOR.
ADIEL Y. DODGE
BY McConkey & Booth
ATTORNEYS.

Patented Feb. 7, 1939

2,146,369

UNITED STATES PATENT OFFICE 2,146,369

TRANSMISSION

Adiel Y. Dodge, South Bend, Ind.

Application August 2, 1935, Serial No. 34,303

7 Claims. (Cl. 74—189.5)

The present invention relates to transmissions and more particularly to transmissions adapted for use in automotive vehicles and including a novel hydraulic torque converter and a gear chain.

It is one of the objects of the invention to provide a transmission which operates efficiently at all speed ratios and which provides extreme flexibility of control.

One arrangement embodying the invention includes a hydraulic torque converter of the type more particularly disclosed and claimed in my copending application Serial No. 57,520, which is a division of the present application. The torque converter preferably includes a centrifugal pump by which liquid is circulated therethrough, either from the casing of the unit or from a gear casing associated therewith. A liquid storage tank may be connected to the casing for the hydraulic unit and is preferably so arranged that rotation of the unit backs liquid up in the storage tank to reduce the depth of the liquid in which the unit must rotate while insuring that ample liquid will always be in the casing for proper operation. A condenser is also preferably connected to the torque converter to condense any vaporized liquid and return it to the converter and the converter is preferably connected to a pressure source such as the engine exhaust to reduce vaporization and assist in circulation of the liquid.

The torque converter is preferably driven by a driving shaft which also drives one element of a planetary gear chain the other elements of which are provided with clutches for selective connection to the torque converter and to the driven shaft. The clutches may be operated manually to connect the torque converter and gear chain in series multiple to provide automatic forward drive or to form other connections producing reverse, positive low or positive one to one as desired. A quick change in ratio to effect an overdrive and/or to utilize the torque converter as a hydraulic brake may also be provided in connection with the above mentioned arrangement of clutches and gears. A speed responsive clutch whose operation is preferably subject to manual control may also be provided to directly connect the driving and driven shafts upon reaching a predetermined speed.

Other objects, advantages and novel features, including novel subcombinations and particular elements, will be apparent from the following detailed description when taken in connection with the accompanying drawings, in which:

Figure 1 is a sectional view with parts in elevation of a transmission embodying the invention;

Figure 2 is a section on the line 2—2 of Figure 1;

Figure 3:
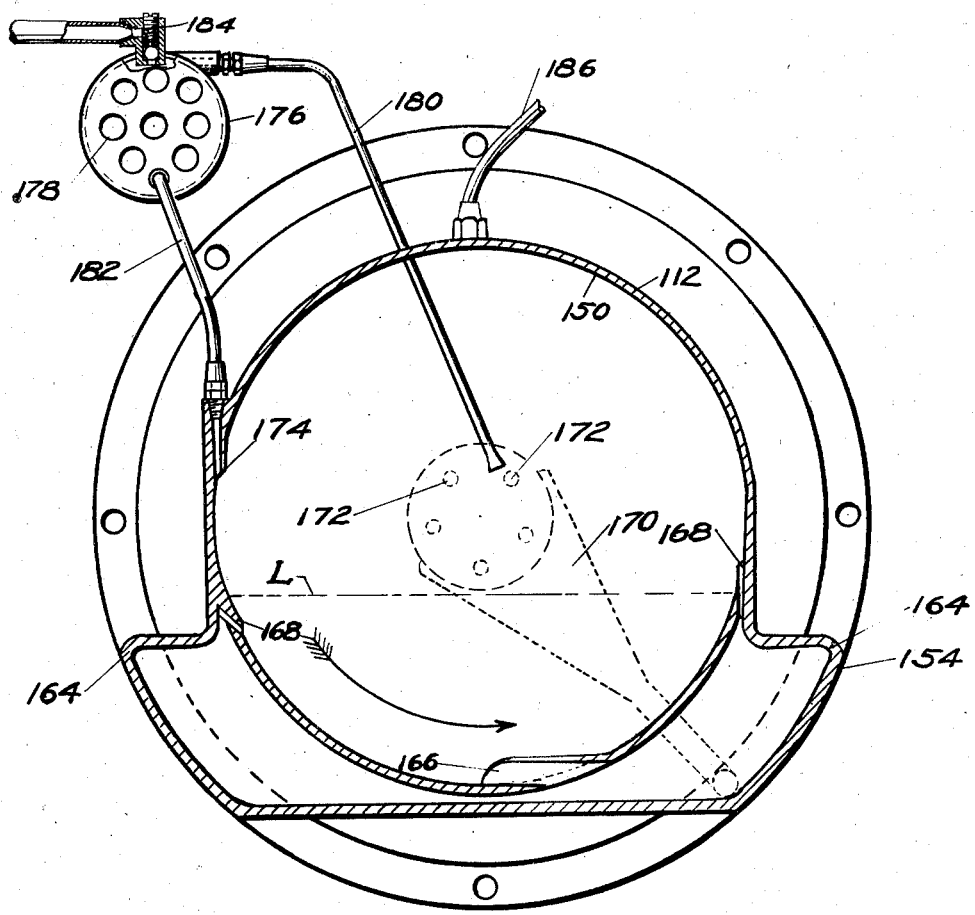
Figure 3 is a section on the line 13—13 of Figure 1 with parts omitted showing a liquid storage arrangement.

Referring more particularly to Figure 1 there is shown a complete transmission adapted for use with an automotive vehicle having an engine with a shaft 1 such as the crankshaft of an internal combustion engine. The shaft 1 drives a flywheel 2 which forms one element of a friction clutch 4 which is operated through levers 6, throw-out bearing 8 and clutch shaft 10 in the usual manner. The driven element of the clutch 4 is splined to a shaft 12 which forms the driving shaft of the transmission and which preferably has a pilot bearing 14 in the engine shaft 1.

The shaft 12 is connected to the driving member of a hydraulic torque converter 16 which may take the form of that shown in my copending applications Serial No. 57,520, filed January 4, 1936, Serial No. 3,544 filed January 26, 1935, or Serial No. 723,083, filed April 30, 1934. The shaft 12 extends through the torque converter and has slidably splined thereto a sun pinion 18 forming one element of a planetary gear chain.

The torque converter 16 includes a driven rotor which is connected to a sleeve 20 on which an offset sleeve 22 is rigidly keyed, the sleeve 22 carrying a dog clutch member 24. A one-way clutch 26 acts between the sleeve 22 and a stationary sleeve 28 to prevent reverse rotation of the rotor and clutch element 24 but permitting forward rotation thereof. The sleeve 28 carries a dog clutch member 30 alined with but spaced from the clutch member 24.

A planetary gear chain is mounted on the shaft 12 and is shown as including the sun gear 18 and a gear carrier 32 which carries a set of double planet gears meshing with the sun gear 18 and a ring gear 34. Both the gear carrier and ring gear are sleeved on the shaft 12 and both have a pair of clutch elements 36 and 38 and 40 and 42 respectively. The entire planetary gear chain is slidable as a unit on the shaft 12 and if desired notches or grooves may be provided on the interior of the sun gear 18 for cooperation with a suitable spring detent 44 to retain the planetary gear chain yieldingly in any one of a plurality of predetermined positions.

The planetary gear set is shifted axially along the shaft 12 by a shift fork 46 operated in any desired manner and engaging a sleeve 48 which is connected to the ring gear 34. The connection between sleeve 48 and the ring gear is preferably constituted by a synchronizing clutch which frictionally engages the ring gear when the sleeve 48 is moved to the right. The sleeve 48 has an internal set of elongated splines engaging external splines on a sleeve 50 which is rigidly connected to a driven shaft 52 and which has on its interior two sets of dog clutch elements 54 and 56 alined with the clutch elements 38 and 42.

The end of the driving shaft 12 is preferably received in a sleeved portion of the driven shaft and a plurality of keys 58 extend through slots in the sleeve portion of the driven shaft and are adapted to move into grooves in the driving shaft to key the driving and driven shafts rigidly together. The keys 58 are cammed inwardly by a cam sleeve 60 slidable on the driven shaft and urged away from the keys by a compression spring 62 and movable toward the keys to cam them inwardly by a manually operable shaft 64 which is connected to the sleeve 60 by a suitable yoke and thrust bearing.

It will be noted that the keys 58 are displaced from a diameter of the shaft 12 in the direction of rotation thereof as indicated by the arrow in Figure 2 and that the ends of the keys are tapered on one side to fit into V-shaped slots in the shaft. This construction enables the keys to be moved into locking position while the shaft and sleeve are rotating relatively and also produces a slight camming action on the keys tending to move them out of locking position so that the shaft and sleeve can be disconnected under load. This is an important feature since it is frequently desirable to connect and disconnect the parts while they are rotating under load.

In order to operate the cam sleeve 60 automatically there is provided a pair of weights 66 pivoted to the driven shaft and having cam noses engaging the sleeve 60. The weights 66 are connected by a spring 68 so connected that as the weights swing in and out the spring will move across their pivot point to produce a snap action. By this means the sleeve 60 will be moved to the left to cam keys 58 into engagement with the driving shaft as soon as the driven shaft reaches a predetermined speed, subject of course to the adjustment of the manual control.

The lines R, N, F, MH, and EL on Figure 1 indicate the various positions of the yoke connection with sleeve 48 for different driving connections. With the parts in the position shown and the yoke at line N, which is the neutral position, all of the clutch elements are disengaged and there is no driving connection between the driving and driven shafts. If the yoke is shifted to its R, or reverse position, the clutches 30 and 40 and the clutches 38 and 54 will be engaged respectively. Thus the ring gear 34 is clutched to the stationary sleeve 28 and the gear carrier is clutched to the driven shaft. Rotation of the sun gear in a forward direction therefore rotates the gear carrier and driven shaft in a reverse direction at reduced speed since the carrier carries a double set of planet gears.

Shifting of the yoke to its F or forward position connects clutch 36 with clutch 24 and clutch 42 with clutch 54. Thus the rotor of the hydraulic unit is connected to the gear carrier and the ring gear is connected to the driven shaft. Rotation of the driving shaft and sun gear 18 will drive the ring gear forwardly at reduced speed since the gear carrier is held against reverse rotation by the one-way clutch 26. As the speed picks up the hydraulic unit will drive the gear carrier forwardly to produce various intermediate speeds until a driving ratio of substantially one to one is reached or until the keys 58 are cammed inwardly to connect the driving and driven shafts directly. This is the normal driving position of the transmission in which the hydraulic unit and gear chain are connected in series multiple to provide two paths of power flow therebetween and in which various driving ratios are produced automatically.

Shifting of the yoke to its MH or manual high position engaged clutches 38 and 56 and disengages clutches 24 and 36 while retaining clutches 42 and 54 in engagement. In this position both the gear carrier and ring gear are clutched to the driven shaft so that the gear unit is locked and rotates as a unit to produce a positive one to one drive.

Further shifting of the yoke to its EL or emergency low position disengages clutches 38 and 56 and engages clutches 36 and 30. Thus the gear carrier is held stationary and a positive low gear drive is produced through the planetary unit in both directions. This arrangement is particularly useful in descending steep hills or in other places where it is desirable to utilize the braking effect of the engine.

Figures 1 and 3 illustrate a liquid feeding arrangement and a condensing system for oil vapors in the gear casing. As shown in Figure 3 the gear casing is formed with extended sides at 164 forming liquid tanks or reservoirs communicating with the casing 112 through a tangential inlet 166 and through small bleed holes 168. The lower part of the liquid tanks is connected through a passage 170 with a series of holes 172 which may communicate with the hydraulic unit to supply liquid thereto. As the gearing rotates in the gear casing it forces liquid into the tanks 164 and builds up a pressure which forces the liquid through the passage 170 and holes 172 into the hydraulic unit. The bleed holes 168 bleed off any entrapped air and allow a limited circulation of liquid through the gear box.

When the unit has been standing and substantially all of the liquid has drained out of the hydraulic unit, the liquid level in casing 112 normally stands at about the line L but as operation starts and the hydraulic unit fills up the level drops until only a very little liquid remains in the casing, rotation of the gearing forcing the liquid into the tanks 164. There must always be some liquid in the gear casing due to circulation through the hydraulic unit and to the tendency of liquid in tanks 164 to back up unless a force is maintained on the inlet 166 but the necessity for maintaining a large quantity of liquid in the gear casing is eliminated.

Figure 3 also illustrates a condenser for condensing any vaporized liquid and returning it to the tank. The condenser as shown is constituted by a radiator 176 having air passages 178 therethrough and which is connected through a pipe 180 to the central part of the gear casing 112. The radiator has a return pipe 182 through which condensate is returned to the casing 112 and an adjustable spring-loaded bleed valve 184 through which uncondensed vapors or air may be bled to the atmosphere.

In order to reduce vaporization and assist in circulation through the hydraulic unit, particularly during starting when the pressure in the hydraulic unit is low, the gear casing is preferably maintained under pressure. Figure 1 illustrates a method of maintaining such pressure by connecting the gear casing 112 through a pipe 186 to the exhaust manifold 188 of an internal combustion engine with which the transmission is used. Since there is no flow through the casing no heating will result from flow of exhaust gases and the pressure maintained in the casing will be sufficient to reduce vaporization substantially. Of course, any other desired source of pressure such as an engine driven pump may be used in place of the exhaust manifold if desired.

While several embodiments of the invention have been shown and described in detail it will be understood that many changes might be made therein and it is not intended to be limited thereto or otherwise than by the terms of the appended claims.

What is claimed is:

1. A hydraulic torque converter comprising a hydraulic unit, a gear casing adapted to contain liquid, gears in said casing drivably connected to said unit, means for forcing liquid from said casing into said unit, means for conducting liquid from said unit back to the casing and means for increasing the pressure in said casing thereby to decrease vaporization of the liquid.

2. A hydraulic torque converter comprising a hydraulic unit, a gear casing adapted to contain liquid, gears in said casing drivably connected to said unit, a rotating member in said casing for feeding liquid to said unit, means in said unit for forcing liquid therethrough, means for returning liquid from the unit to the casing and means for increasing the pressure in said casing thereby to decrease vaporization of the liquid.

3. A hydraulic torque converter comprising a hydraulic unit, means for circulating liquid through said unit, a casing for holding liquid and connected to said unit in circuit whereby liquid may be circulated through the unit and the casing in series, and means for increasing the pressure in said casing.

4. A transmission for use with an internal combustion engine comprising, a hydraulic unit, a casing adapted to contain liquid, a gear chain in said casing drivably connected to said unit, means for circulating liquid from said casing through said unit, and a connection from the engine exhaust to said casing to increase the pressure therein.

5. A transmission for connecting a driving and a driven shaft arranged end to end comprising a hydraulic unit connected to the driving shaft, a gear chain having one element connected to the driving shaft and another element connected to the hydraulic unit and another element connected to the driven shaft, said driving shaft extending through the hydraulic unit and gear chain, and speed responsive means adjacent the ends of said shafts for automatically connecting the driving and driven shafts directly.

6. A transmission for connecting a driving and a driven shaft comprising a hydraulic torque multiplying unit having a driving member connected to the driving shaft and a driven member connected to a clutch element, a gear chain having one element connected to the driving shaft and two other elements each connected to a pair of clutch elements, a stationary clutch element, a clutch element on the driven shaft, and means to shift said clutch elements to connect one of said gear elements to the stationary clutch and another to the driven shaft to provide reverse drive, or to connect said driven member to one of the gear elements and another gear element to the driven shaft to provide automatic forward drive, or to connect said two other gear elements to the driven shaft to provide positive one to one drive, or to connect one of said gear elements to the stationary clutch and another to the driven shaft to provide positive low gear drive.

7. A transmission comprising a hydraulic unit, a stationary casing adjacent said unit, a tank communicating with said casing, means in said casing to force liquid from the casing into the tank, a connection from the tank to the hydraulic unit to conduct liquid thereto, means to conduct liquid from the unit to the casing, and means to increase the pressure in the casing.

ADIEL Y. DODGE.